(12) United States Patent
DeMan

(10) Patent No.: US 9,839,929 B2
(45) Date of Patent: Dec. 12, 2017

(54) DISPENSING PUMP WITH CUP SPRING

(71) Applicant: WESTROCK MWV, LLC, Richmond, VA (US)

(72) Inventor: Eelco H. DeMan, Vlijmen (NL)

(73) Assignee: Silgan Dispensing Systems Corporation, Grandview, MO (US)

( * ) Notice: Subject to any disclaimer, the term of this patent is extended or adjusted under 35 U.S.C. 154(b) by 0 days.

(21) Appl. No.: 15/108,811

(22) PCT Filed: Dec. 31, 2014

(86) PCT No.: PCT/US2014/072926
§ 371 (c)(1),
(2) Date: Jun. 29, 2016

(87) PCT Pub. No.: WO2015/105715
PCT Pub. Date: Jul. 16, 2015

(65) Prior Publication Data
US 2016/0332181 A1 Nov. 17, 2016

Related U.S. Application Data

(60) Provisional application No. 61/926,490, filed on Jan. 13, 2014.

(51) Int. Cl.
*B05B 11/00* (2006.01)
(52) U.S. Cl.
CPC ...... *B05B 11/3069* (2013.01); *B05B 11/3001* (2013.01); *B05B 11/304* (2013.01); *B05B 11/3077* (2013.01)

(58) Field of Classification Search
CPC ............ B05B 11/3069; B05B 11/3077; B05B 11/3001; B05B 11/304
See application file for complete search history.

(56) References Cited

U.S. PATENT DOCUMENTS

| | | | |
|---|---|---|---|
| 3,753,518 A | 8/1973 | Kutik | |
| 4,762,475 A * | 8/1988 | Fuchs | B05B 11/3077 222/321.2 |
| 7,793,803 B2 | 9/2010 | Neerinex et al. | |
| 9,681,731 B2 * | 6/2017 | Jo | A45D 40/0075 |
| 2009/0140009 A1 | 6/2009 | Chen | |
| 2011/0084099 A1 | 4/2011 | Carta | |
| 2014/0305971 A1* | 10/2014 | Goettke | B05B 11/3001 222/380 |

* cited by examiner

*Primary Examiner* — Donnell Long
(74) *Attorney, Agent, or Firm* — Barlow, Josephs & Holmes, Ltd.

(57) ABSTRACT

A dispensing pump (10) for liquids, viscous materials, foams, gels, etc. includes a resilient cup spring (18) so that the entire pump can be more easily recycled. The dispensing pump (10) includes a base portion (12), an inlet valve (14), a piston valve (16), a cup spring (18), a spring guide structure (20) and a pump actuator (22). When actuated, the cup spring (18) is elastically deformed over opposing spring ribs (39), and then upon release, the cup (18) elastically returns to its normal at rest shape, returning the guide (20) and pump actuator (22) to their normal at rest positions. The cup spring (18) includes structures which interact with the piston valve (16) to open the outlet valve.

16 Claims, 9 Drawing Sheets

DISPENSING PUMP WITH CUP SPRING

BACKGROUND OF THE INVENTION (1) Field of the Invention

The instant invention relates to a dispensing pump for liquids, viscous flowable materials, foams, gels, etc. and more particularly to a dispensing pump with a cup-shaped plastic spring.

(2) Description of Related Art

Dispensing pumps are generally known in the art. They generally comprise a body portion which is seated on the neck of a container, a co-acting nozzle portion which slides relative to the body portion, and a spring structure which biases the co-acting nozzle portion to its normal rest position. To dispense the material in the container, the user manually depresses the nozzle which forces the material from the inside of the body portion. When the nozzle is released, the spring forces the nozzle portion back to its normal resting position.

SUMMARY OF THE INVENTION

An exemplary embodiment of a dispensing pump according to the present invention generally comprises a base portion, an inlet valve, a piston valve, a resilient polymer cup spring, a spring guide and a pump actuator.

The base portion has a bottom wall and an upwardly extending sidewall. The bottom wall includes a centrally located entrance orifice which is received in communication with the neck of a container (not shown) having the material to be dispensed held within. The base portion further has a flow conduit extending upwardly from the inner surface of the bottom wall which surrounds the entrance orifice.

The inlet valve is received within the entrance orifice and is slidably movable between a normal closed position where the inlet valve is seated within the entrance orifice and an open position where the inlet is unseated from the entrance orifice to allow material to flow into the flow conduit from the container.

The piston valve has a lower end received within the flow conduit, an upper end and an outlet opening adjacent the upper end.

The cup spring has an annular upper wall and a downwardly depending outer sidewall. In accordance with the teachings of the invention, the polymer cup spring is preferably molded from a polymer material similar to that of the other pump structures so that the entire dispensing pump can be easily recycled. The metal springs in prior art devices forced disassembly of the pump prior to recycling and thus restricted both use and disposal of the prior art device. The cup spring further includes an inner annular piston wall extending downwardly from the upper wall.

To provide interacting elements for the cup spring, the base portion includes two opposed spring ribs extending upwardly from the bottom wall. The spring ribs have a ramped outer edge which interacts with the outer sidewall of the cup spring to deform the cup spring from its normal at rest position. In operation, the cup spring will be forced downwardly over the spring ribs where both the sidewall and upper wall will elastically deform to allow the cup to fit over the spring ribs. The deformation of the cup walls store energy and will return the cup spring to its normal at rest position when downward force is released from the cup spring.

The cup spring is received within the base portion with the lower peripheral edge of the sidewall of the cup spring received on the ramped edges of the spring ribs, and such that the upper end of the piston valve is concentrically received within the inner piston wall, and further such that the outer surface of the inner piston wall is disposed concentrically within the flow conduit. In this regard, the piston valve is slidably movable within the flow conduit and within the inner piston wall, and the upper end of the piston valve engages and cooperates with the inner piston wall to form an outlet valve.

The guide structure has a top wall, an outer sidewall depending downwardly and outwardly from the top wall, and a downwardly facing channel which interfittingly engages an annular ridge extending upwardly from the top wall of the cup spring. The top wall also includes an outlet orifice located within the inner annular wall. The guide structure is received within the base portion wherein the terminal outer edge of the outer sidewall is slidably received within the outer sidewall of the base portion. This arrangement permits the guide structure to be slidably movable within the base portion and the interfitting structures facilitate guided movement of the cup spring with the guide structure.

The pump actuator includes a top wall, downward depending sidewalls and a dispensing orifice with an internal conduit. The pump actuator is received over the guide structure and within the sidewall of the base portion where the internal conduit of the dispensing orifice communicates with the outlet orifice of the guide structure and the pump actuator is slidably movable relative to the base portion.

In operation, forcible downward compression of the pump actuator causes a corresponding downward movement of the guide structure, a corresponding guided downward movement and deformation of the cup spring over the spring ribs, a corresponding sliding movement of the inner piston wall of the cup spring relative to the upper end of the piston valve to open the outlet valve and a corresponding downward sliding movement of the piston valve to force material within the flow conduit to flow through the outlet valve, through the outlet orifice of the guide structure and finally out through the dispensing orifice of the nozzle.

Upon the subsequent release of the pump actuator, the cup spring elastically returns to its normal at-rest shape and position, causing a forcible upward movement of the guide structure and pump actuator, a corresponding sliding movement of the inner piston wall of the cup spring relative to the upper end of the piston valve to close the outlet valve, and a corresponding upward sliding movement of the piston valve, which in turn creates a vacuum pressure within the flow conduit drawing the inlet valve from its normally closed position to its open position and drawing material into the flow conduit through the inlet orifice.

BRIEF DESCRIPTION OF THE DRAWINGS

While the specification concludes with claims particularly pointing out and distinctly claiming particular embodiments of the instant invention, various embodiments of the invention can be more readily understood and appreciated from the following descriptions of various embodiments of the invention when read in conjunction with the accompanying drawings in which:

DETAILED DESCRIPTION OF THE INVENTION

Figure 1:
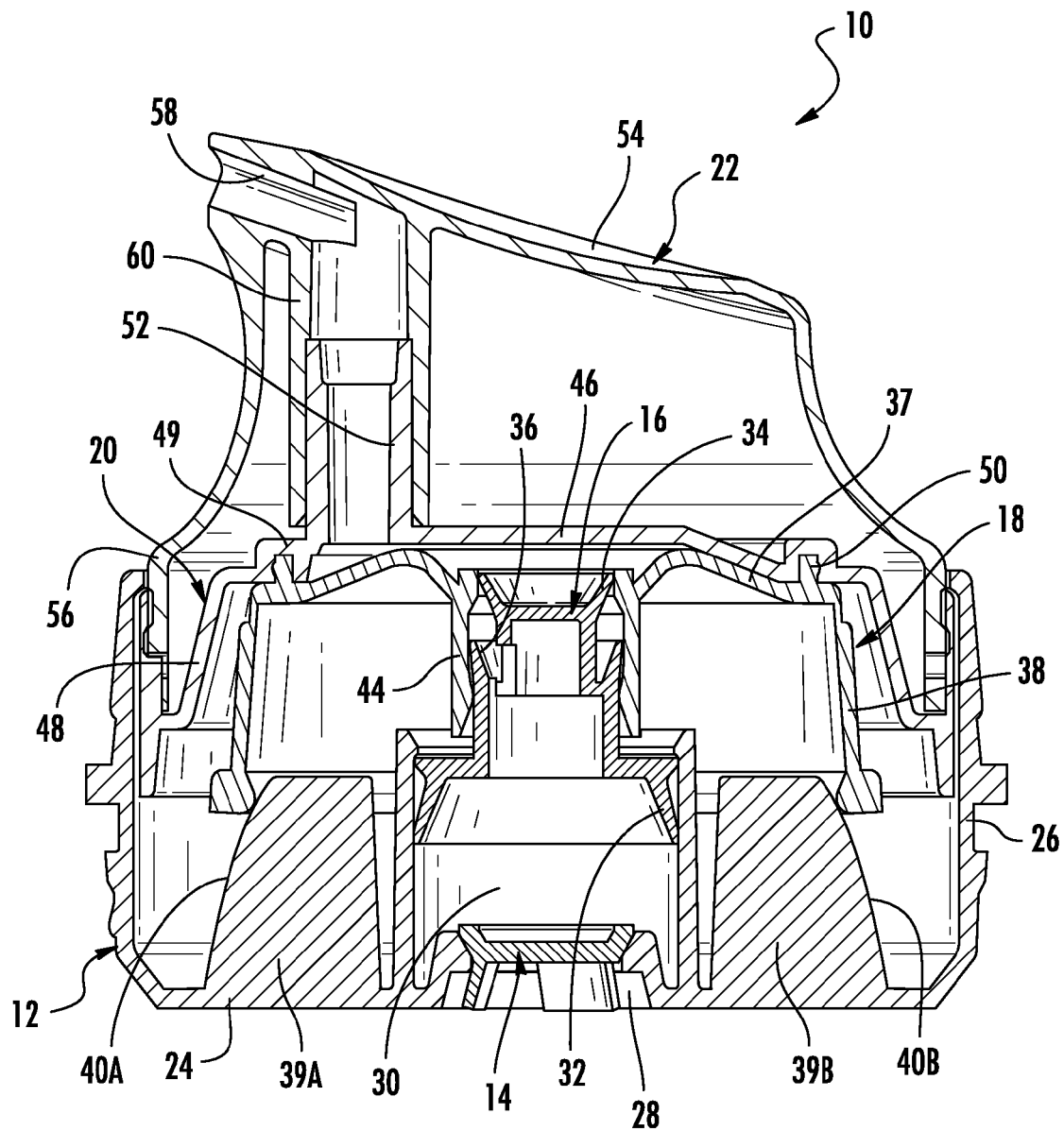
FIGS. 1-7 are a sequential cross-sectional views of an exemplary embodiment of the dispensing pump of the present invention as it is cycled through a normal at-rest position, compression to empty flow conduit, return stroke to refill the flow conduit, and return to the normal at-rest position.
Figure 2:
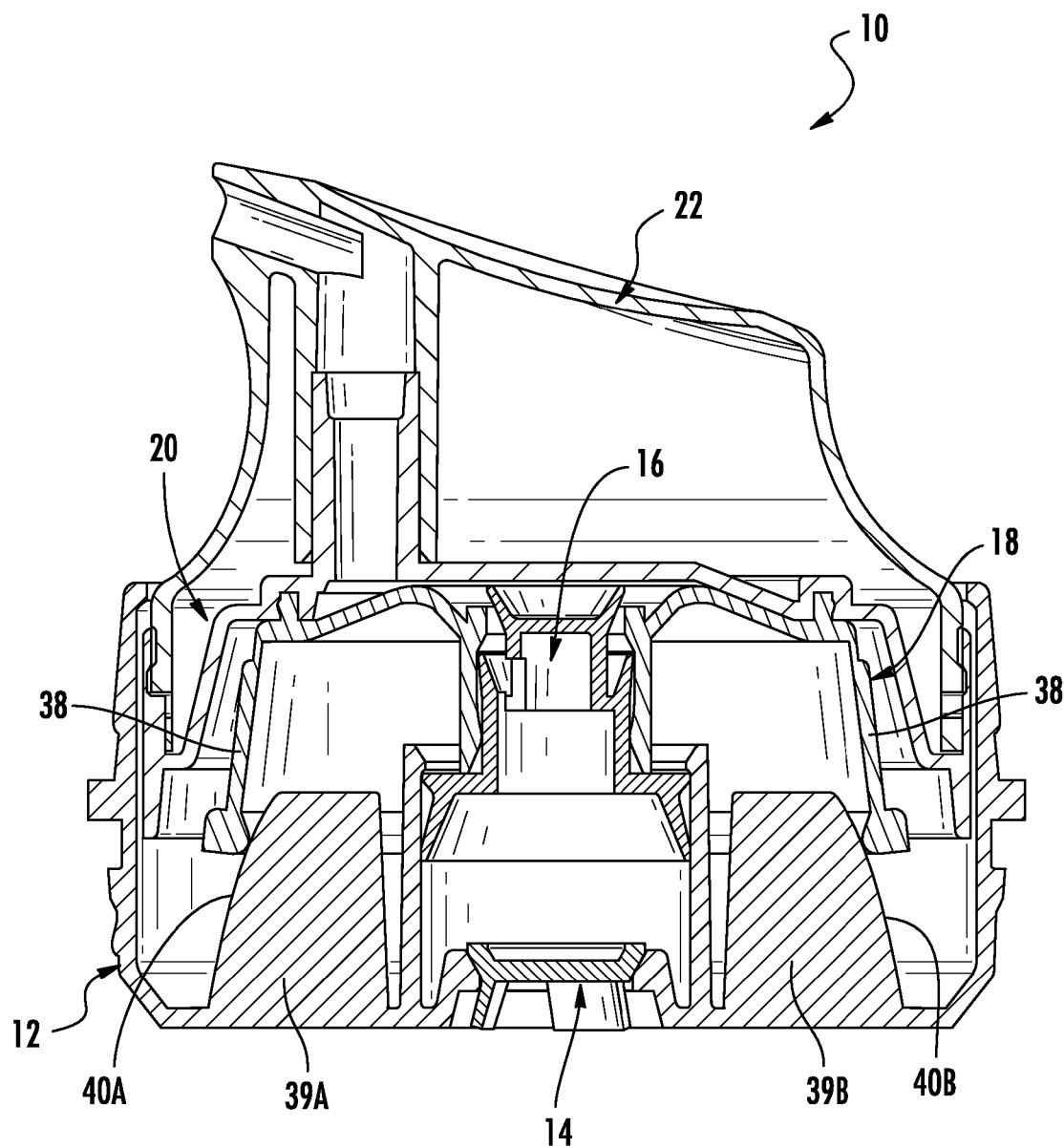
Figure 3:
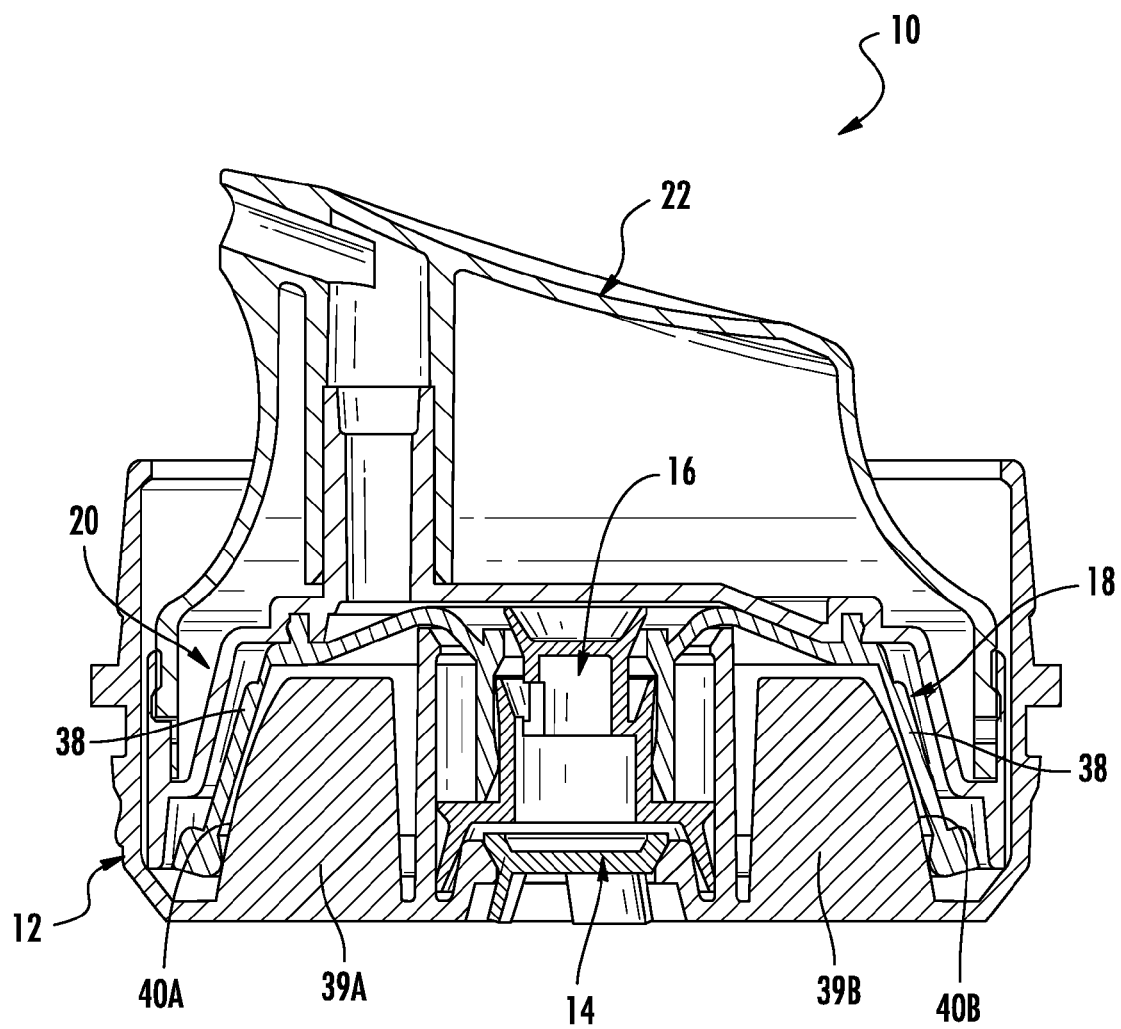
Figure 4:
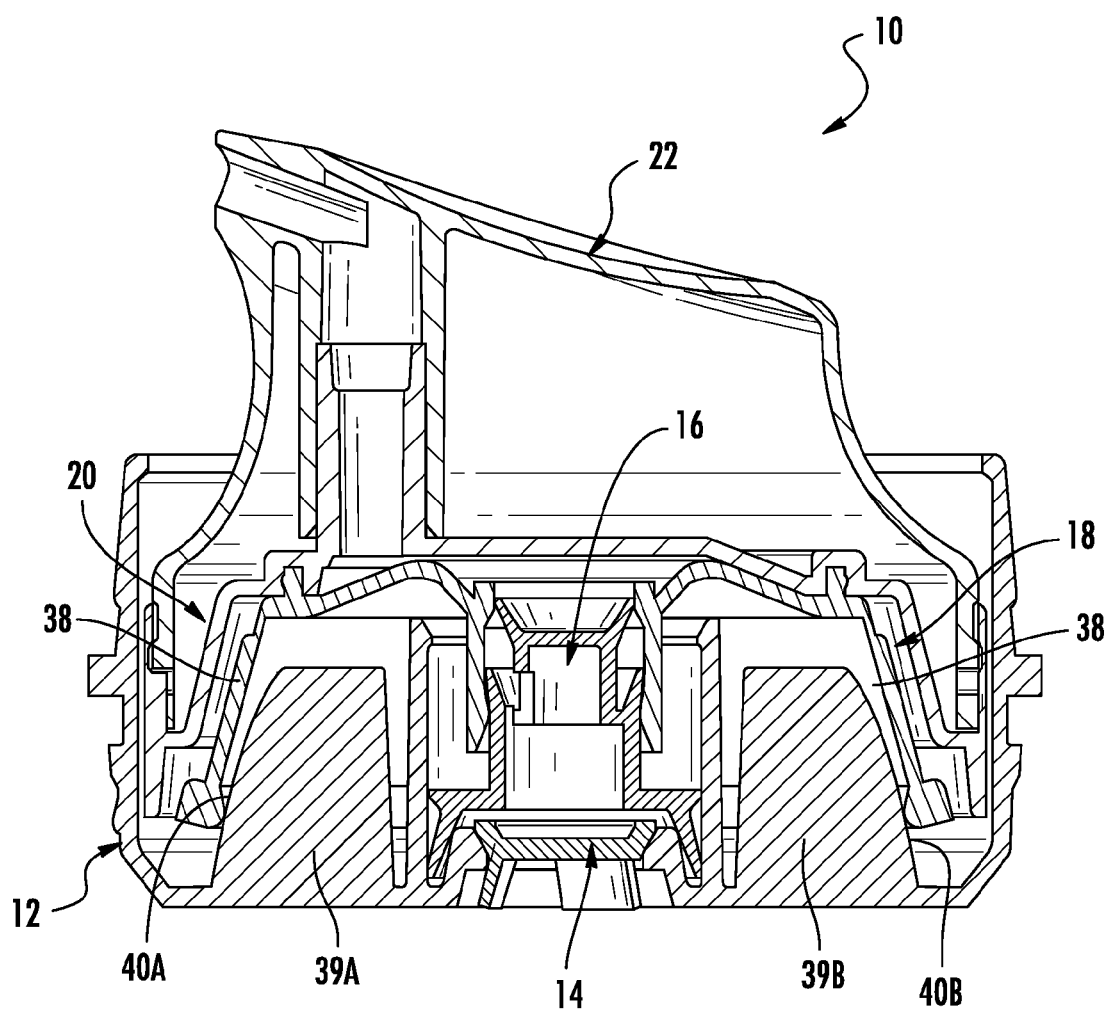

Referring now to the drawings, an exemplary embodiment of the invention is generally indicated at 10 in FIG. 1-7. According to the present invention, the dispensing pump 10 generally comprises a base portion 12, an inlet valve 14, a piston valve 16, a resilient polymer cup spring 18, a spring guide 20 and a pump actuator 22.

The base portion 12 has a bottom wall 24 and an upwardly extending sidewall 26. The bottom wall 24 includes a centrally located entrance orifice 28 which is received in communication with the neck of a container (not shown) having the material (not shown) to be dispensed held within. The dispensing pump 10 is useful for a variety of flowable materials, including, not limited to liquids, viscous flowable fluids, foams, gels, etc. The base portion 12 further has a flow conduit 30 extending upwardly from the inner surface of the bottom wall 24 which surrounds the entrance orifice 28.

The inlet valve 14 is received within the entrance orifice 28 and is slidably movable between a normal closed position where the inlet valve 14 is seated within the entrance orifice 28 and an open position where the inlet valve 14 is unseated from the entrance orifice 28 to allow material to flow into the flow conduit 30 from the container.

The piston valve 16 is generally cylindrical and has a lower end 32 received within the flow conduit 30, an upper end 34 and an outlet opening 36 adjacent the upper end 34.

The cup spring 18 has an annular upper wall 37 and a downwardly depending outer sidewall 38. In the exemplary embodiment, upper wall 37 is slightly bulged upwardly to provide additional elastic spring force. In accordance with the teachings of the invention, the cup spring 18 is preferably molded from a polymer material (such as polypropylene) similar to that of the other pump structures so that the entire dispensing pump 10 can be assembled from all plastic parts and thus, easily recycled. The metal spring in prior art devices forced disassembly of the pump prior to recycling and thus restricted both use and disposal of the prior art device.

To provide interacting elements to deform the cup spring 18, the base portion 12 includes two opposed spring ribs 39A,39B extending upwardly from the bottom wall. As can be seen in the figures, the spring ribs 39A, 39B have a ramped outer edge 40A,40B which interacts with the outer sidewall 38 of the cup spring 18 to deform the cup spring 18 from its normal at rest position. More specifically, it can be seen that the top end of the ramped edges 40A,40B have a smaller radius that the sidewall 38 of the cup spring 18, while the bottom end thereof has a larger radius. This allows the cup spring 18 to initially sit on top of the spring ribs 39A,39B and then gradually deform the sidewall 38 as the cup spring 18 is forced down onto the ribs 39A,39B.

In operation, the cup 18 spring will be forced downwardly over the spring ribs 39A,39B where both the sidewall 38 and upper wall 37 will elastically deform to allow the cup 18 to fit over the larger diameter portions of the spring ribs 39A,39B. The deformation of the plastic cup walls 37,38 store energy and will return the cup spring 18 to its normal at rest position when downward force is released from the top of the cup spring 18. The ramped edges 40A,40B facilitate both downward deformation of the cup spring 18 as well as the elastic return thereof.

Figure 10:
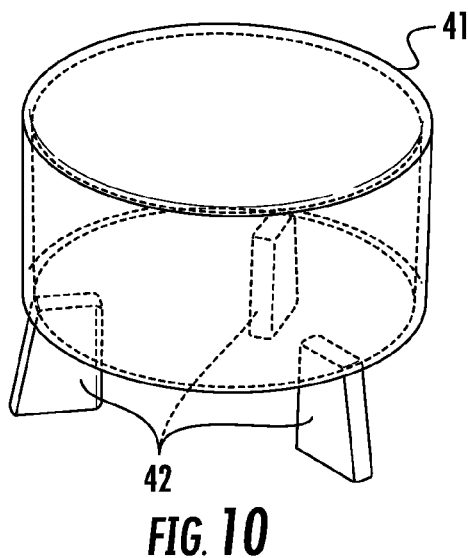
FIGS. 10-13 are perspective view of a basic cup-shaped spring deformed over 3 equally spaced spring ribs.
Figure 11:
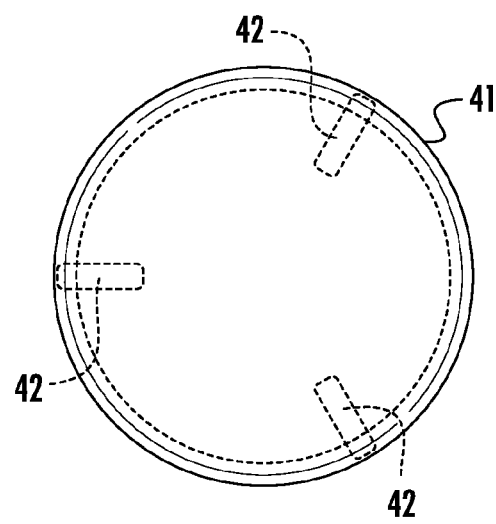
Figure 12:
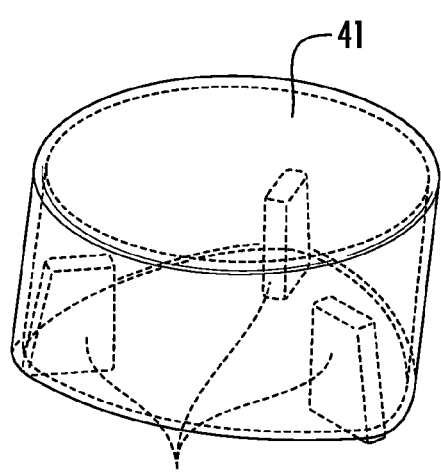
Figure 13:
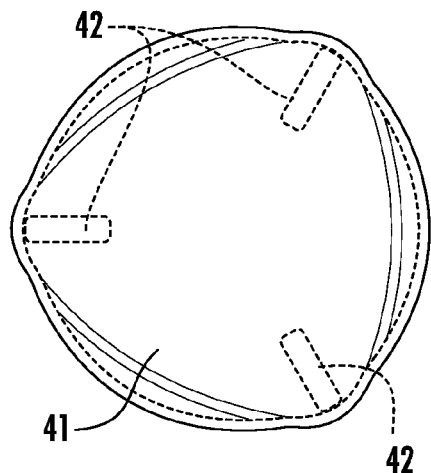

Referring briefly to FIGS. 10-13, elastic deformation of another exemplary cup spring 41 can be easily seen in connection with the use of 3 equally spaced spring ribs 42. FIGS. 10 and 11 show the cup spring 41 in its normal at-rest position, while FIGS. 12 and 13 show the cup spring 41 compressed down onto the spring ribs 42 and deformed to fit over the spring ribs 42.

Referring back to FIGS. 1-7, the cup spring 18 is received within the base portion 12 with the lower peripheral edge of the sidewall 38 of the cup spring 18 received on the ramped edges 40A,40B of the spring ribs 39A,39B, and such that the upper end 34 of the piston valve 16 is concentrically received within the inner piston wall 44, and further such that the outer surface of the inner piston wall 44 is disposed concentrically within the flow conduit 30. In this regard, the piston valve 16 is slidably movable within the flow conduit 30 and within the inner piston wall 44, and the upper end 34 of the piston valve 16 engages and cooperates with the inner piston wall 44 to form an outlet valve.

The guide structure (cup spring guide) 20 has a top wall 46, an outer sidewall 48 depending downwardly and outwardly from the top wall 46, and a downwardly facing channel 49 which interfittingly engages an annular ridge 50 extending upwardly from the upper wall 37 of the cup spring 18. The top wall 46 also includes an outlet orifice 52 located within the perimeter of the channel 49. The guide structure 20 is received within the base portion 12 wherein the terminal outer edge of the outer sidewall 48 is slidably received within the outer sidewall 26 of the base portion. This arrangement permits the guide structure 20 to be slidably movable within the base portion 12 while the interfitting structures 49,50 facilitate guided deformation and elastic return of the cup spring 18.

The pump actuator 22 includes a top wall 54, downward depending sidewalls 56 and a dispensing orifice 58 with an internal conduit 60. The pump actuator 22 is received over the guide structure 20 and within the sidewall 26 of the base portion 12 where the internal conduit 60 of the dispensing orifice 58 communicates with the outlet orifice 52 of the guide structure 20 and the pump actuator 22 is slidably movable relative to the base portion 12.

In operation (see sequential FIGS. 1-3), forcible downward compression of the pump actuator 22 causes a corresponding downward movement of the guide structure 20, a corresponding guided downward movement and deformation of the cup spring 18 over the spring ribs (FIG. 2), a corresponding sliding movement of the inner piston wall 44 of the cup spring 18 relative to the upper end 34 of the piston valve 16 (FIG. 2) to open the outlet valve and lastly a corresponding downward sliding movement of the piston valve 16 (FIG. 3) to force material within the flow conduit 30 to flow out through the outlet valve, through the outlet orifice 52 of the guide structure 20 and finally out through the dispensing orifice 58 of the pump actuator 22.

Figure 5:
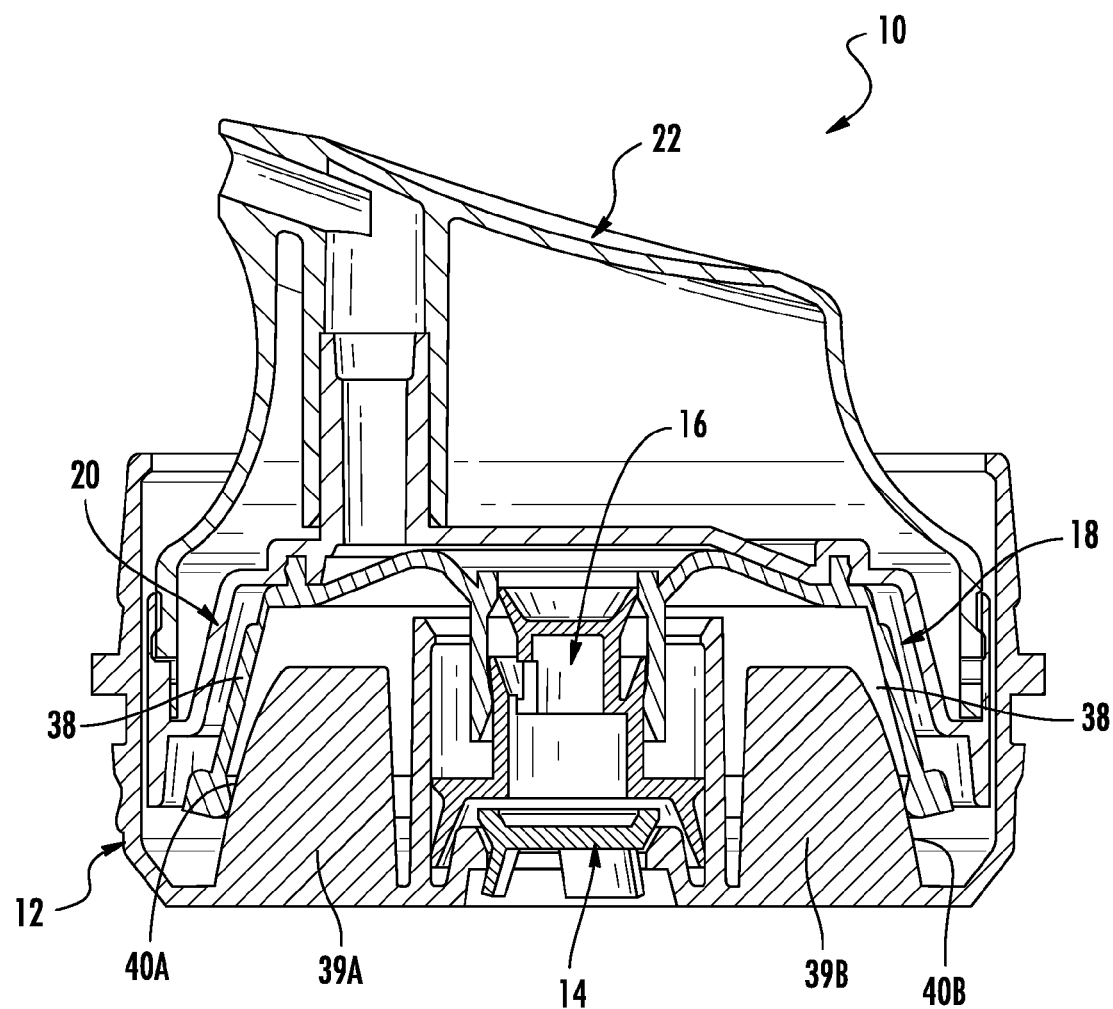
Figure 6:
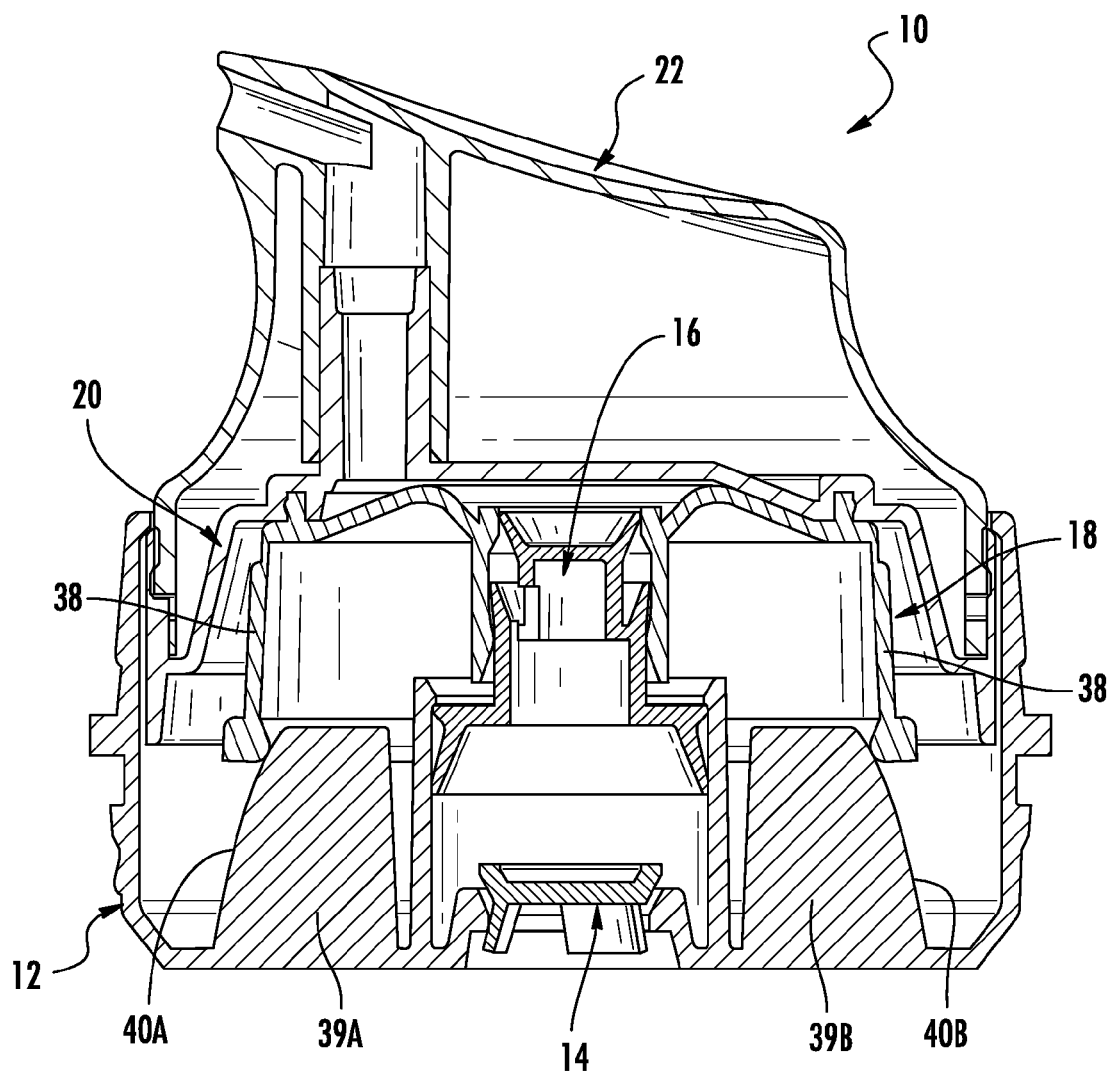
Figure 7:
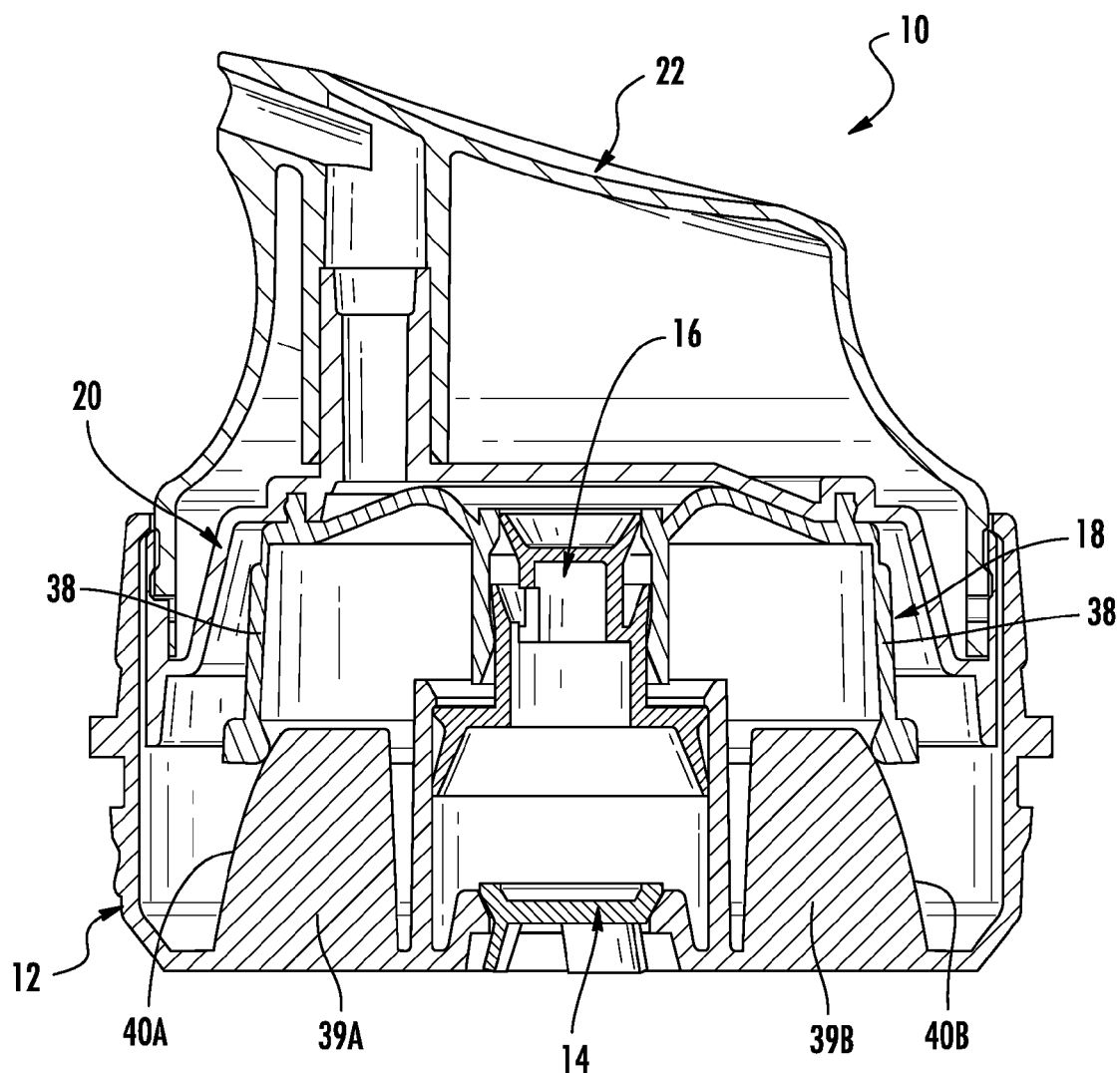

Upon the subsequent release of the pump actuator 22 (See sequential FIGS. 4-7), the cup spring 18 elastically returns (return stroke) to its normal at rest position (FIG. 8), causing a forcible upward movement of the guide structure 20 and pump actuator 22 (FIGS. 4-6), a corresponding sliding movement of the inner piston wall 44 of the cup spring 18 relative to the upper end 34 of the piston valve 16 to close the outlet valve (FIGS. 5-6), and a corresponding upward sliding movement of the piston valve 16, which in turn creates a vacuum pressure within the flow conduit 30 drawing the inlet valve 14 upwardly from its normally closed position to its open position and drawing material into the flow conduit 30 through the inlet orifice 28 (FIGS. 5-6).

When the cup spring 18 returns to its normal at-rest position (FIG. 7), the flow conduit 30 is re-filled with material and vacuum pressure is reduced allowing the inlet valve 14 to return to its normally closed position.

Figure 8:
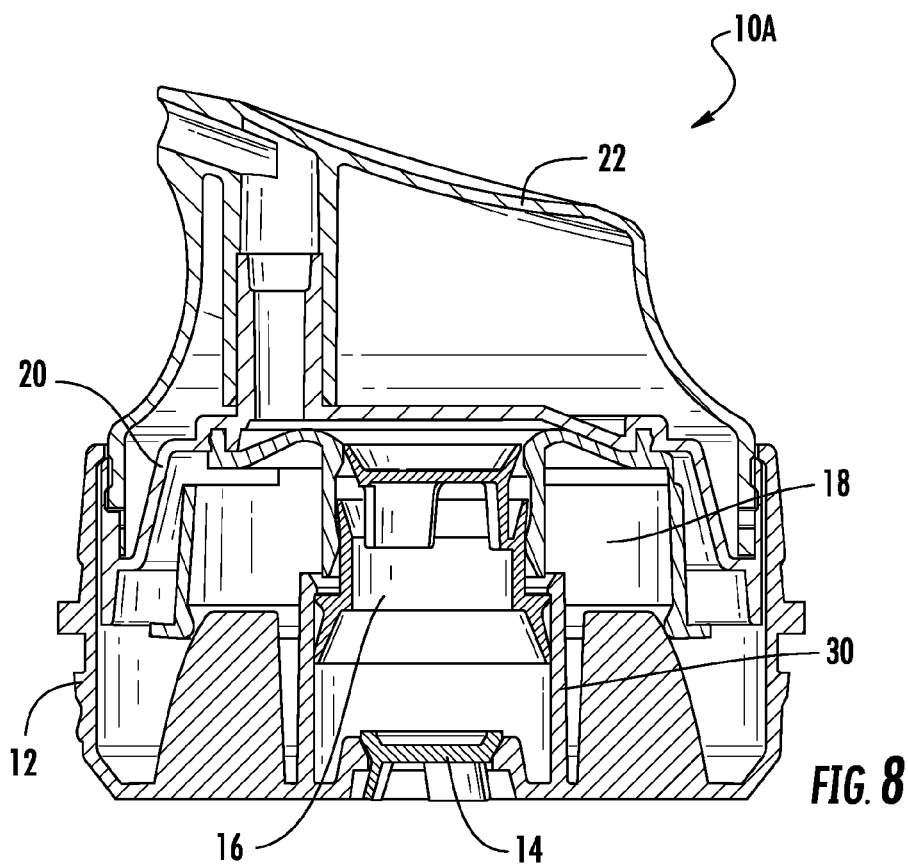
FIGS. 8-9 are cross-sectional view of another exemplary embodiment with a slightly larger piston valve.
Figure 9:
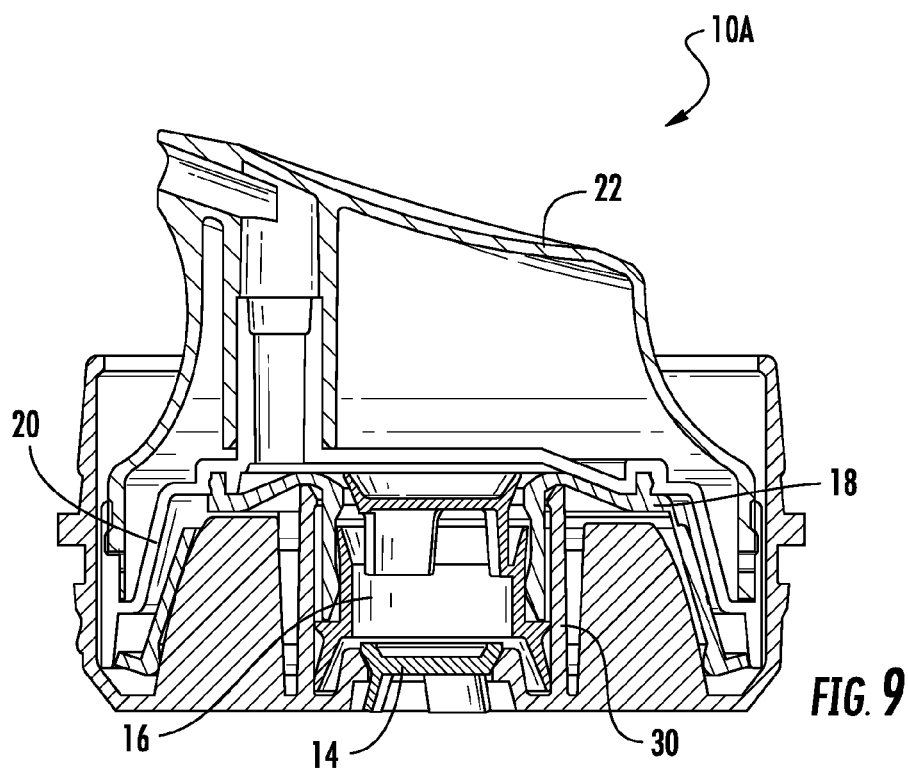

Referring to FIGS. 8 and 9, another exemplary embodiment 10A is illustrated showing the use of a slightly larger diameter piston valve 16 to permit a larger flow of material out of the flow conduit 30. The larger piston valve 16 also stabilizes compression of the cup spring 18 and return movement of the entire assembly.

It can therefore be seen that the exemplary embodiments may provide a unique dispensing pump which can be entirely constructed from plastic molded parts and thus easily recycled.

While there is shown and described herein certain specific structures embodying various embodiments of the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A dispensing pump comprising:
   a base portion having a bottom wall and an upwardly extending sidewall, said bottom wall including a centrally located entrance orifice, said base portion further having a flow conduit extending upwardly from an inner surface of the bottom wall and surrounding the entrance orifice;
   an inlet valve received within the entrance orifice, said inlet valve being slidably movable between a normal closed position where the inlet valve is seated within the entrance orifice and an open position where the inlet is unseated from the entrance orifice;
   a piston valve having a lower end received within the flow conduit, an upper end and an outlet opening adjacent the upper end;
   a cup spring having an annular upper wall and a downwardly depending outer sidewall,
   said cup spring further including an inner piston wall extending downwardly from the upper wall,
   said base portion including at least two opposed spring ribs extending upwardly from the bottom wall,
   said cup spring being received within the base portion such that the upper end of the piston valve is concentrically received within the inner piston wall, an outer surface of the inner piston wall is disposed concentrically within the flow conduit, and the outer sidewall of the cup spring is seated on the spring ribs,
   said upper end of said piston valve engaging and cooperating with said inner piston wall to form an outlet valve,
   said piston valve being slidably movable within the flow conduit and within the inner piston wall;
   a guide structure having a top wall and an outer sidewall depending downwardly and outwardly from the top wall,
   said guide structure being received within the base portion wherein a terminal outer edge of the outer sidewall of the guide structure is slidably received within the upwardly extending sidewall of the base portion,
   said guide structure being slidably movable within the base portion; and
   a pump actuator having a top wall, sidewalls and a dispensing orifice, the pump actuator being received over the guide structure and within the base portion where the dispensing orifice communicates with an outlet orifice of the guide structure, said pump actuator being slidably movable within the base portion,
   whereby forcible downward compression of the pump actuator causes a deformation of the cup spring over the spring ribs and forces material within the flow conduit to flow out of a nozzle, and
   whereby upon release of the pump actuator the cup spring elastically returns to its normal at-rest shape and draws material into the flow conduit through the entrance orifice.

2. The dispensing pump of claim 1 wherein said base portion includes at least 3 or more equally spaced spring ribs.

3. The dispensing pump of claim 2 wherein said spring ribs have a ramped outer edge with a radius smaller than the outer sidewall of the cup spring at a top end thereof and a radius larger than the outer sidewall of the cup spring at a bottom end thereof.

4. The dispensing pump of claim 3 wherein said upper wall of said cup spring and said top wall of said guide structure have interfitting formations to facilitate guided movement of the cup spring.

5. The dispensing pump of claim 2 wherein said upper wall of said cup spring and said top wall of said guide structure have interfitting formations to facilitate guided movement of the cup spring.

6. The dispensing pump of claim 1 wherein said spring ribs have a ramped outer edge with a radius smaller than the outer sidewall of the cup spring at a top end thereof and a radius larger than the outer sidewall of the cup spring at a bottom end thereof.

7. The dispensing pump of claim 6 wherein said upper wall of said cup spring and said top wall of said guide structure have interfitting formations to facilitate guided movement of the cup spring.

8. The dispensing pump of claim 1 wherein said upper wall of said cup spring and said top wall of said guide structure have interfitting formations to facilitate guided movement of the cup spring.

9. A dispensing pump comprising:
   a base portion having a bottom wall and an upwardly extending sidewall, said bottom wall including a centrally located entrance orifice, said base portion further having a flow conduit extending upwardly from an inner surface of the bottom wall and surrounding the entrance orifice;
   an inlet valve received within the entrance orifice, said inlet valve being slidably movable between a normal closed position where the inlet valve is seated within the entrance orifice and an open position where the inlet is unseated from the entrance orifice to allow material to flow into the flow conduit;
   a piston valve having a lower end received within the flow conduit, an upper end and an outlet opening adjacent the upper end;
   a cup spring having an annular upper wall and a downwardly depending outer sidewall,
   said cup spring further including an inner piston wall extending downwardly from the upper wall,
   said base portion including at least two opposed spring ribs extending upwardly from the bottom wall,
   said cup spring being received within the base portion such that the upper end of the piston valve is concentrically received within the inner piston wall, an outer surface of the inner piston wall is disposed concentrically within the flow conduit, and the outer sidewall of the cup spring is seated on the spring ribs, said upper end of said piston valve engaging and cooperating with said inner piston wall to form an outlet valve, said piston valve being slidably movable within the flow conduit and within the inner piston wall;

a guide structure having a top wall and an outer sidewall depending downwardly and outwardly from the top wall, said guide structure being received within the base portion wherein a terminal outer edge of the outer sidewall of the guide structure is slidably received within the upwardly extending sidewall of the base portion, said guide structure being slidably movable within the base portion; and a pump actuator having a top wall, sidewalls and a dispensing orifice, the pump actuator being received over the guide structure and within the base portion where the dispensing orifice communicates with an outlet orifice of the guide structure, said pump actuator being slidably movable within the base portion, whereby forcible downward compression of the pump actuator causes a corresponding downward movement of the guide structure, a corresponding guided downward movement and deformation of the cup spring over the spring ribs, a corresponding sliding movement of the inner piston wall of the cup spring relative to the upper end of the piston valve to open the outlet valve and a corresponding downward sliding movement of the piston valve to force material within the flow conduit to flow out through the outlet valve, the outlet orifice of the guide structure and the dispensing orifice of a nozzle, and whereby upon release of the pump actuator the cup spring elastically returns to its normal at-rest shape causing a forcible upward movement of the guide structure and pump actuator, a corresponding sliding movement of the inner piston wall of the cup spring relative to the upper end of the piston valve to close the outlet valve, and a corresponding upward sliding movement of the piston valve, which in turn creates a vacuum pressure within the flow conduit drawing the inlet valve from its normally closed position to its open position and drawing material into the flow conduit through the entrance orifice.

10. The dispensing pump of claim 9 wherein said base portion includes at least 3 or more equally spaced spring ribs.

11. The dispensing pump of claim 10 wherein said spring ribs have a ramped outer edge with a radius smaller than the outer sidewall of the cup spring at a top end thereof and a radius larger than the outer sidewall of the cup spring at a bottom end thereof.

12. The dispensing pump of claim 11 wherein said upper wall of said cup spring and said top wall of said guide structure have interfitting formations to facilitate guided movement of the cup spring.

13. The dispensing pump of claim 10 wherein said upper wall of said cup spring and said top wall of said guide structure have interfitting formations to facilitate guided movement of the cup spring.

14. The dispensing pump of claim 9 wherein said spring ribs have a ramped outer edge with a radius smaller than the outer sidewall of the cup spring at a top end thereof and a radius larger than the outer sidewall of the cup spring at a bottom end thereof.

15. The dispensing pump of claim 14 wherein said upper wall of said cup spring and said top wall of said guide structure have interfitting formations to facilitate guided movement of the cup spring.

16. The dispensing pump of claim 9 wherein said upper wall of said cup spring and said top wall of said guide structure have interfitting formations to facilitate guided movement of the cup spring.

\* \* \* \* \*